United States Patent
Walker

[15] 3,677,628
[45] July 18, 1972

[54] REVERSIBLE ENDLESS LOOP CARTRIDGE PROJECTOR FOR TEACHING MACHINES

[72] Inventor: Richard K. Walker, Convent, N.J.
[73] Assignee: E. R. E. Laboratory, Inc., West Orange, N.J.
[22] Filed: Nov. 2, 1970
[21] Appl. No.: 86,076

[52] U.S. Cl..............................352/128, 352/169, 352/173, 352/174, 352/188, 352/193, 242/55.19 A, 179/100.2 Z
[51] Int. Cl...............G03b 21/00, G03b 21/12, G11b 23/06
[58] Field of Search.....................352/72, 78, 128, 129, 169, 352/174, 184, 188, 193; 353/26; 242/55.19 R, 55.19 A; 226/33, 38

[56] References Cited

UNITED STATES PATENTS

| | | | |
|---|---|---|---|
| 2,042,599 | 6/1936 | Heinis | 242/55.19 R |
| 3,246,817 | 4/1966 | Floden | 352/169 X |
| 3,564,367 | 2/1971 | Wanner et al. | 226/38 X |
| 3,591,272 | 7/1971 | Reh | 352/194 X |
| 3,365,140 | 1/1968 | Post | 242/55.19 R |

*Primary Examiner*—Samuel S. Matthews
*Assistant Examiner*—Russell E. Adams, Jr.
*Attorney*—George H. Fritzinger

[57] ABSTRACT

A motion picture projector for educational purposes is provided using an endless loop cartridge. The projector has a step advance for projecting single frames or motion pictures and has also a continuous drive operable alternatively to scan the film forwardly or rewind the film at high speed and to stop in either direction at any selected frame. The endless loop cartridge has special means to keep the film roll in a loose condition to permit continuous drive of the film in either direction without jamming.

10 Claims, 12 Drawing Figures

Patented July 18, 1972

INVENTOR.
RICHARD K. WALKER

BY George H. Fritzinger

AGENT

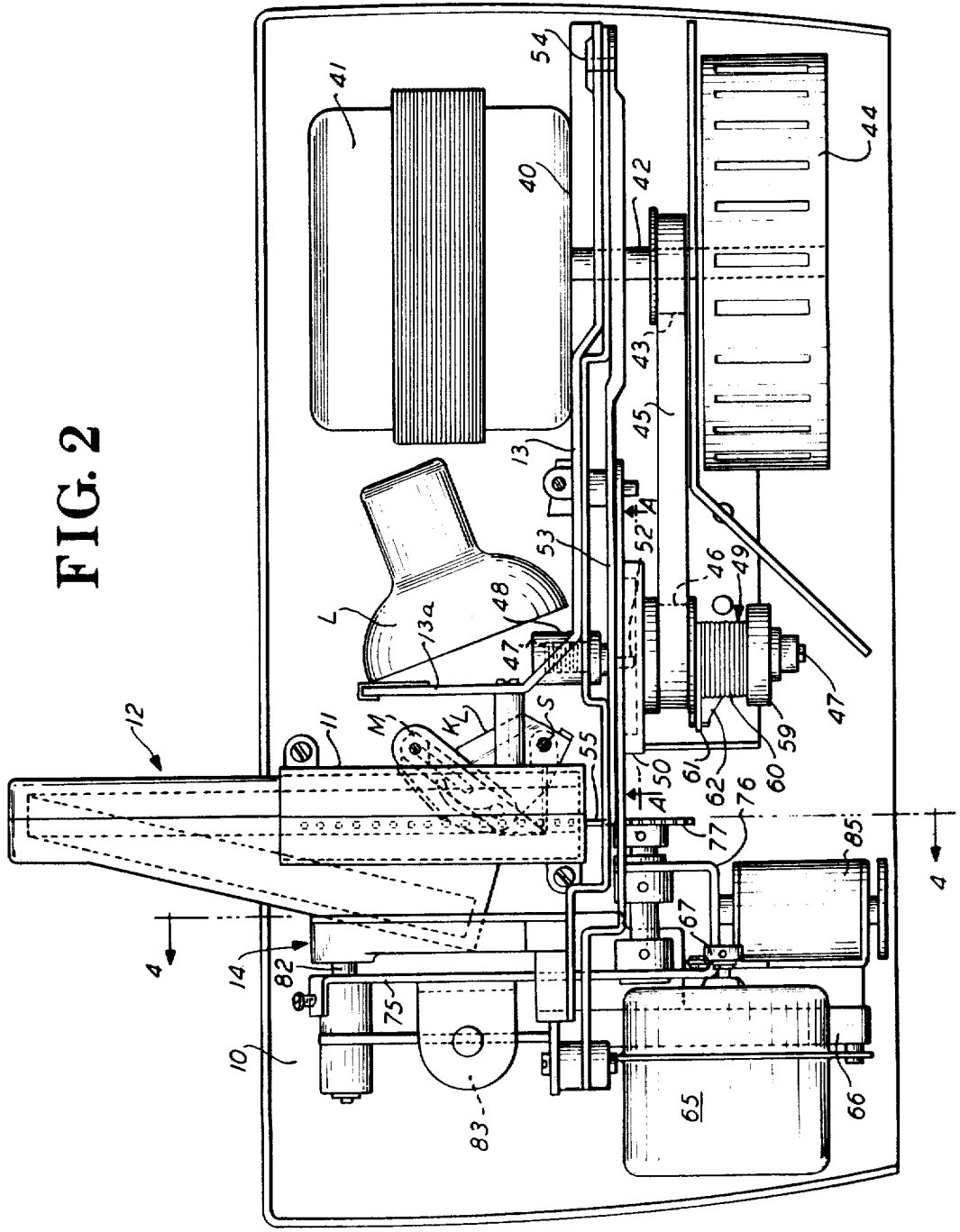

Patented July 18, 1972

INVENTOR.
RICHARD K. WALKER

BY George H. Fritzinger

AGENT

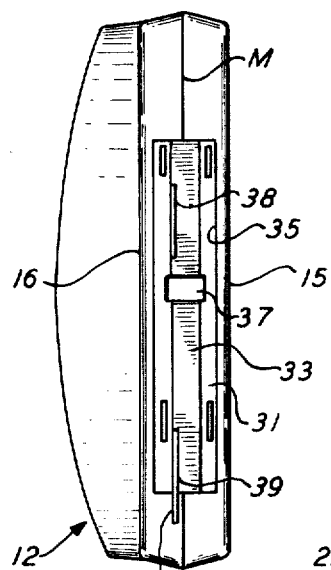
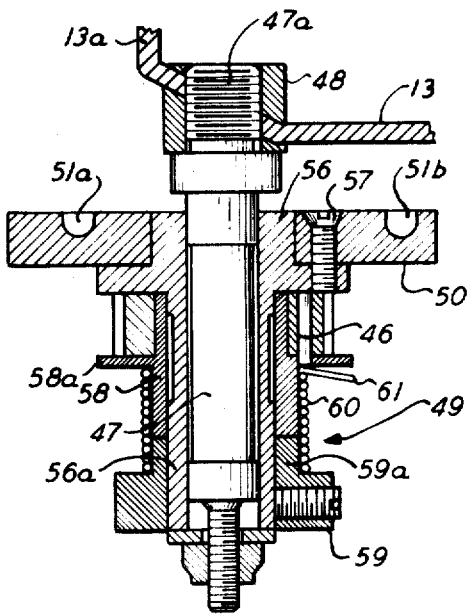
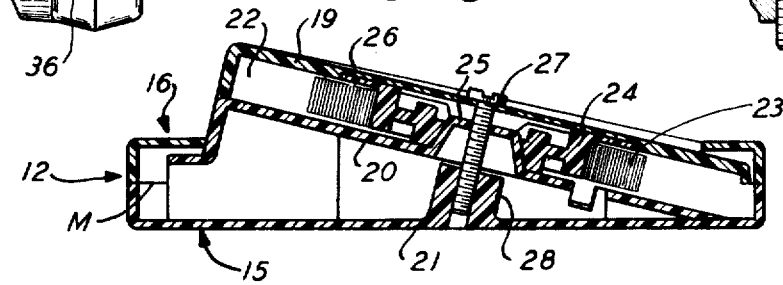
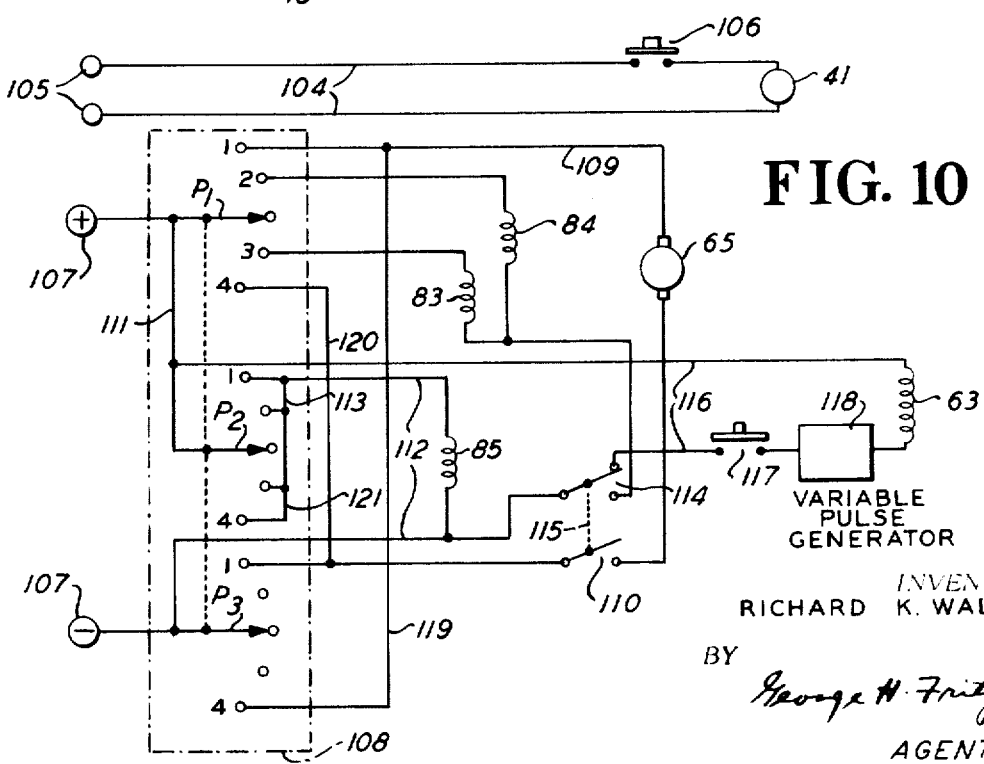

REVERSIBLE ENDLESS LOOP CARTRIDGE PROJECTOR FOR TEACHING MACHINES

An object of the invention is to provide a projector wherein each step advance of the film is at a high speed to eliminate the need for a blade shutter.

Another object is to provide such projector wherein the film is advanced at extreme but uniform speed and is stopped with precision at any selected frame.

Another object is to provide such projector using an endless loop cartridge wherein the roll of film is agitated by movement of the film to permit continuous fast scan drive of the film in either direction.

Another object is to provide such projector having both a normal cam-driven claw mechanism for individual frame advance and having also a high speed sprocket drive for scanning forwardly or backwardly wherein the two mechanisms are electrically interlocked to prevent one from being engaged while the other is operating.

Another object is to provide such projector having a fast scan drive of the film in either direction with a facility to stop the film at any time within the distance of approximately one-half frame movement.

These and other objects and features of the invention will be apparent from the following description and the appended claims.

In the description of my invention reference is had to the accompanying drawings, of which:

FIG. 2 is a top plan view of this projector;

FIG. 7 is an end elevation of the complete cartridge;

FIG. 8 is a sectional view through the cartridge taken on the line 8—8 of FIG. 5;

FIG. 9 is a fractional sectional view taken on the line 9—9 of FIG. 1; and

FIG. 10 is a schematic circuit diagram of the control circuitry of this projector.

Figure 1:
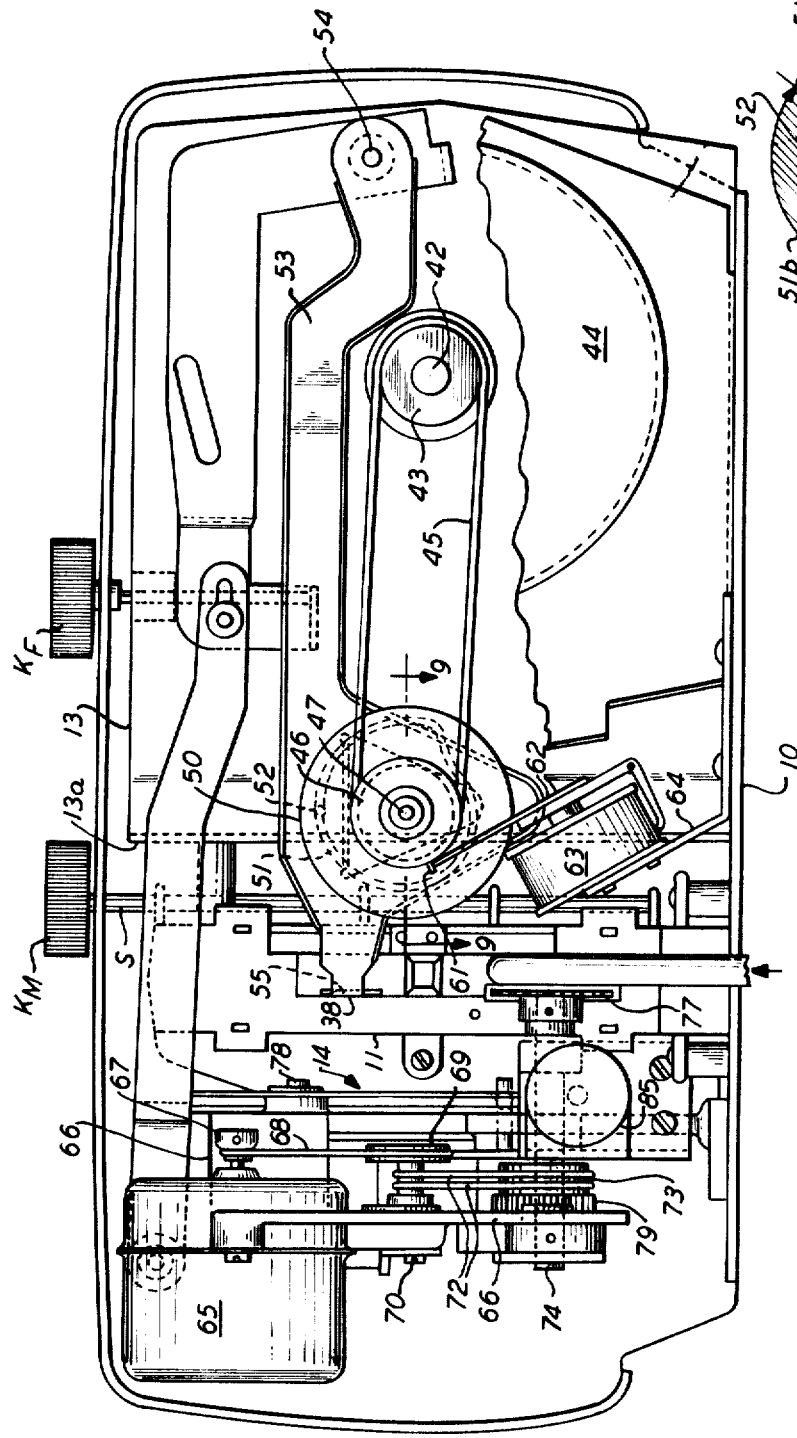
FIG. 1 is a front elevational view of a motion picture projector incorporating my invention.

The film projector shown in the accompanying drawings has a base plate 10 to a central portion of which is secured a housing 11 open at the back for receiving an 12. endless loop film cartridge 12. A vertical frame plate 13 is mounted on the base plate 10 leading from the housing 11 to the right side of the base plate centrally thereof. This vertical frame plate carries an intermittent drive mechanism for the film as is later described. A frame bracket 14 is mounted on the base plate at the left of the housing 11 for carrying a sprocket drive scan mechanism for the film.

The film cartridge 12 comprises two sections 15 and 16 of a U-shaped contour (FIGS. 5 and 6) which engage at a medial plane M (FIG. 8) and which are interlocked in a definite relationship by dowels 17 in section 16 and by mating holes 18 in section 15. The section 16 has a circular portion 19 outwardly extending obliquely from the side wall thereof proceeding from the circular end to the square end of the section. The section 15 has an internal oblong wall 20 inclined inwardly proceeding from the circular end towards the square end of the section. The inner end of this wall 20 is semi-circular on a small radius about the center axis A of the circular portion of the section 15 and the outer end terminates on a larger radius about the axis A near the square end of the section. The circular portion 19 and the inner wall 20 cooperate to form a semi-closed chamber 22 (FIG. 8) for a roll 23 of film. The roll 23 is loosely wound on a spool 24 rotatable on a frusto-conical hub 25 projecting from the internal wall 20. The spool has a side flange 26 only at its side spaced from the wall 20. Extending centrally through the circular wall 19 is a screw 27 which threads into the hub 25 to hold the sections 15 and 16 together. The cartridge sections are preferably molded of a non-conductive plastic and the inner surfaces are preferably sprayed with a Teflon compound to render them static-free.

A loop of the film leads from the outer convolution of the roll 23 via a guideway 29 along the upper wall of the cartridge (as it is mounted in the projector). This guideway has a curved end portion leading the film along the square end wall 30 of the cartridge whereat it is retained by a metal guide strip 31 biased against the end wall 30 by a torsion spring 32. The metal strip 31 has a depressed central portion 33 (FIG. 7) along the length thereof forming a guideway for the film. From the metal guide strip 31 the film is led via a track 34 to the inner convolution of the film roll 23.

In the square end wall of the cartridge there is a wide rectangular opening 35 (FIG. 7) having an extending slot 36 at the bottom thereof. In the metal guide strip 31 there is a central lens opening 37 to expose a single frame of the film, a slot 38 aligned with the sprocket holes in the film to permit a stepping claw hereinafter described to engage the film and a slot 39 in registration with the slot 36 to permit a sprocket wheel to engage the film hereinafter described.

Figure 2A:
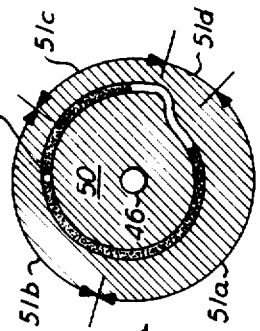
FIG. 2A is a sectional view on the line A—A of FIG. 2.

The vertical frame plate 13 has a left portion offset to the rear at 40 and has a double bend at its left end terminating in a rearwardly extending wall 13A (FIG. 2). Mounted on the back side of the rightward portion of the frame plate 13 is a drive motor 41 having a horizontal drive shaft 42 extending through the frame plate and carrying a drive pulley 43 and a blower fan 44. The drive pulley is coupled by a belt 45 to a pulley 46 journalled on a shaft 47 which is threaded at its rear end into a bushing 48 secured to the frame plate 13 (FIG. 9). This pulley is coupled by a clutch 49 of the single-tooth one-revolution integrating type to a disk 50 having a rear end face provided with a full-revolution cam groove 51. Engaging this groove is a cam follower pin 52 staked to a cantilever-type drive member 53 of spring material. This drive member is pivoted at 54 to the right end portion of the frame plate 13 and extends leftwardly therefrom past the disk 50 and terminates at its left end in a claw 55 turned rearwardly for engaging the respective sprocket holes in the film via the slot 38. The drive member 53 is biased forwardly to cause the cam follower pin 52 to engage the groove 51 under pressure. The cam groove 51 has a dwell portion 51A(FIG. 2A) of approximately 150° length at a nearly constant radius about the center shaft 46, a succeeding portion 51B of approximately 120° length continuing clockwise at an increasing radius from the shaft 46, a dwell portion 51C of approximately 60° length on a larger radius and a remaining portion 51D of approximately 30° length which curves sharply inwardly to connect the end of the portion 51C to the beginning of the portion 51A. Approximately the last half of the portion 51C and the whole portion 51C are very shallow to cause the pin 52 to flex the drive member away from the cam disk 50 and cause the claw 55 to engage the film as the pin 52 traverses these portions of the cam groove. The remaining portion of the cam groove is relatively deep to enable the claw to be disengaged from the film by the spring biasing of the drive member. In the rest position of the cam disk 50 the pin 52 is at about 30° from the end of the cam portion 51B as shown in FIG. 1. Thus, during a first 60° movement of the cam disk in a counterclockwise direction the drive member is held stationary and out of engagement with the film, during the next 30° the drive member is flexed rearwardly by the pin 52 riding onto a shallow portion of the cam groove to engage the claw 55 with the film, during the next 30° the film is advanced by one frame in a downward direction, during the next 20° the pin 52 rides off the shallow portion into a remaining deep portion of the cam groove to disengage the claw from the film, during the next 130° the claw 55 is held relatively stationary and during the next 90° the claw is returned relatively slowly to its start position.

The clutch 49 for the intermittent film advance mechanism comprises a flanged hub 56 journalled on the shaft 47 and secured to the cam disk 50 by screws 57. Journaled on a cylindrical extension 56A of the hub is a sleeve 58 having a cylindrical flange 58A midway thereof forming one side of the pulley 46, the other side of the pulley being formed by the flange of the hub 56. Secured to the forward end of the cylindrical extension 58A of the hub is a collar 59 having a cylindrical extension 59A abutting the sleeve 58 and conforming in diameter thereto. Gripping the cylindrical extension 59A and the adjacent portion of the sleeve 58 is a helical clutch spring 60 having a radial tang 61 at its inner end. This tang is normally blocked against rotation in a counterclockwise direction — the direction of advance of the pulley 46 — by a latch armature 62 of a solenoid 63 mounted on a bracket 64 extending upwardly from the base plate 10. This clutch spring normally couples the pulley 46 to the cam disk 50 but when the tang is blocked by the latch armature 62 the rotation of the pulley sleeve through its frictional rubbing contact with the spring tends to unwind the clutch spring and uncouple it from the pulley. However, the instant the tang is released the clutch spring grips the pulley sleeve to couple the drive motor 41 to the cam disk 50 and start the cam disk rotating. Upon the solenoid 63 being deenergized during the ensuring revolution of the cam disk the latch armature returns to latching position to stop the tang after one revolution of movement thereof and to limit the drive of the cam disk 50 to one revolution. This single revolution of the cam disk 50 advances the film by a single frame. If the solenoid 63 is held activated over a period of time the film is advanced intermittently by successive frames. Such repeated advance of the film will project motion pictures. In the present machine each advance of the film is at a very high speed within 5 to 6 milliseconds instead of the usual 12 to 25 milliseconds so that film motion is imperceptible to make it unnecessary to use the usual shutter for blocking out the projection during the film advance.

The light source for the projector is a lamp L(FIG. 2) shining through the lens opening 37 by reflection from a mirror M. The mirror is movable into and out of the cartridge 12 by turning a knob $K_m$(FIG. 1) on a shaft S coupled to the mirror by a linkage $K_l$. Another knob $K_f$(FIG. 1) is the usual normal control for adjusting the frames relative to the lens opening.

The scan drive for the film comprises a reversible drive motor 65 mounted on a norizontal ledge 66 at the top of the bracket 14. The motor has a drive pulley 67 coupled by a belt 68 to a reduction pulley 69 journaled on a stud shaft 70 staked to a portion of the bracket 14. The pulley 69 is in turn coupled by two belts 72 to a double grooved pulley 73 pinned to a shaft 74. The shaft 74 is journaled in one bearing mounted in a rocker plate 75 and in a second bearing mounted in a right angle arm 76 turned over from the same rocker plate (FIG. 2). Pinned to the right end of the shaft 74 is a sprocket scan wheel 77 which is engageable with the film via the slot 39 (FIG. 7). The rocker plate is pivoted on a stud 78 near the top of the bracket 14 (FIG. 3) to enable the sprocket wheel 77 to be shifted into and out of engagement with the film.

Figure 3:
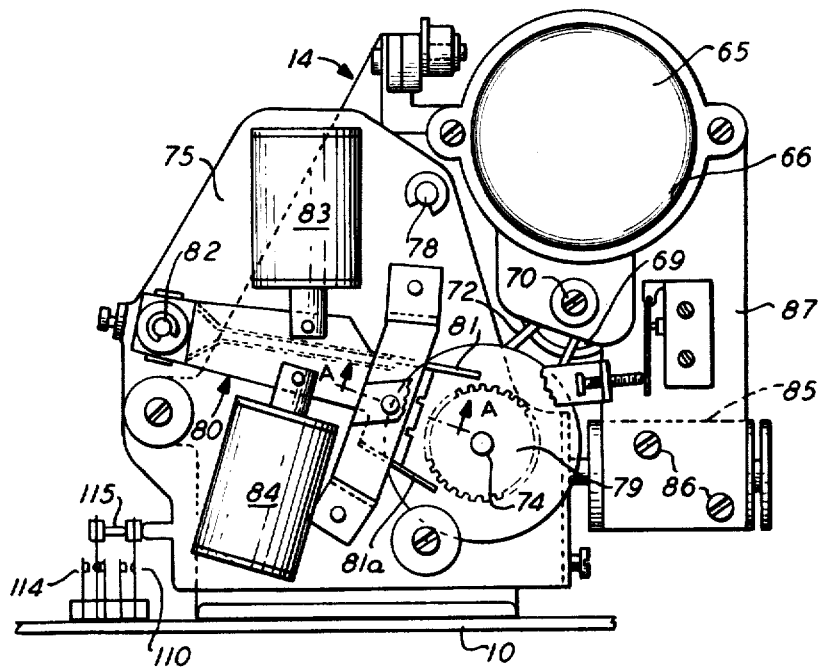
FIG. 3 is a left elevational view of the projector.
Figure 4:
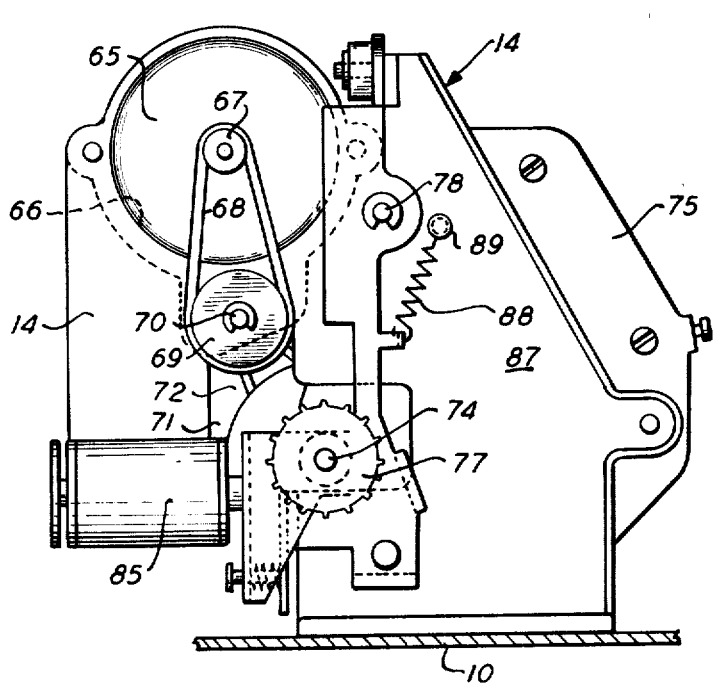
FIG. 4 is a sectinal view taken on the line 4—4 of FIG. 2.

Secured to the pulley 73 is a ratchet wheel 79 (FIGS. 1 and 3) and cooperable with the ratchet wheel is a double latch pawl 80 having respective pawls 81 and 81A engageable with the top and bottom portions of the ratchet wheel. The latch pawl 80 is pivoted on a stud 82 carried by the rocker plate near the left side thereof. The latch pawl is operable upwardly to engage the arm 81A with the ratchet wheel 79 by a solenoid 83 mounted on the rocker plate 75 and is operable downwardly to engage the arm 81 with the ratchet wheel 79 by a solenoid 84 also mounted on the rocker plate 75. The rocker plate is itself shiftable about the pivot 78 by a solenoid 85 secured by screws 86 to a leg 87 depending from the ledge 66 of the bracket 14. The rocker plate is biased to hold the sprocket wheel 77 normally disengaged from the film by a tension spring 88 connected between the rocker plate and a pin 89 staked to the leg 87 (FIG. 4). Upon energizing the solenoid 85 the rocker plate is pushed rearwardly to engage the sprocket wheel with the film.

Figure 3A:
FIG. 3A is a fractional sectional view taken on the line A—A of FIG. 3.

In order that the sprocket wheel will be returned in registration with the sprocket holes of the film each time the solenoid 85 is energized, a bracket 90 is mounted on the latch pawl 80 and provided with a pin 91 extending through the latch pawl to nearly the rocker plate 75, and a cooperating stud 92 is mounted on the bracket 14 (FIG. 3A). When the latch pawl 80 is shifted upwardly by the solenoid 83 to latch the sprocket wheel 77 against clockwise movement and the solenoid 85 is deenergized to allow the spring 88 to disengage the sprocket wheel 77 from the film, the pin 91 is moved directly above the pin 92 to hold the arm 81A engaged with the ratchet wheel; and vice versa, when the solenoid 84 is energized to engage the arm 81 with the ratchet wheel 79 and the solenoid 85 is deenergized the pin 91 is moved directly below the pin 92 to hold the pawl 80 again engaged with the ratchet wheel.

The instant the respective pawl arms 81 and 81A are engaged with the ratchet wheel 79 the power to the drive motor 65 is shut off. The sprocket wheel 77 is thus stopped instantly but because of inertia the belt drive coupling between the motor and the pulley 73 will undergo momentary slippage. This momentary slippage is without any detrimental effect.

Figure 5:
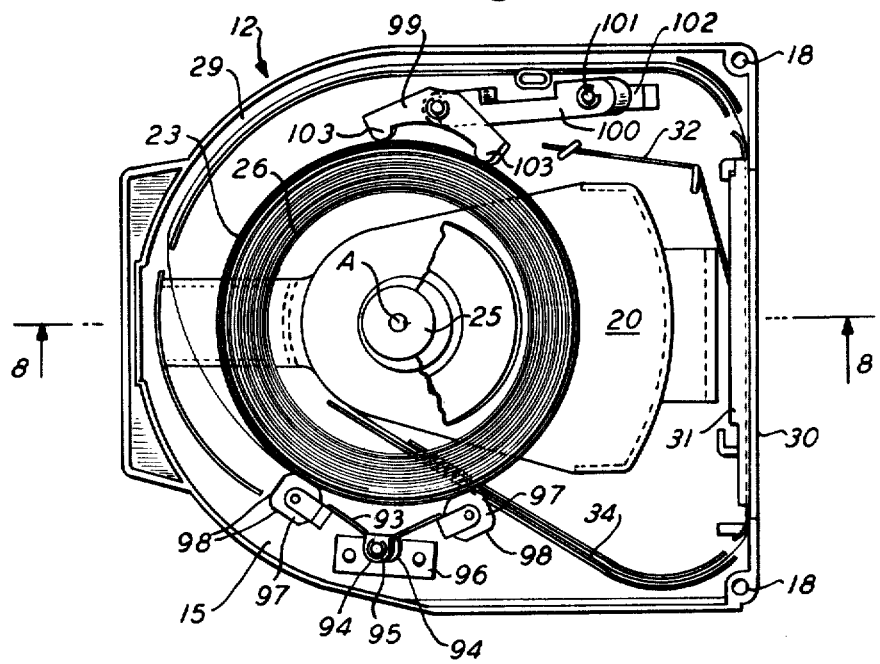
FIG. 5 is a view of the frame section of the endless loop cartridge with the cover removed.
Figure 6:
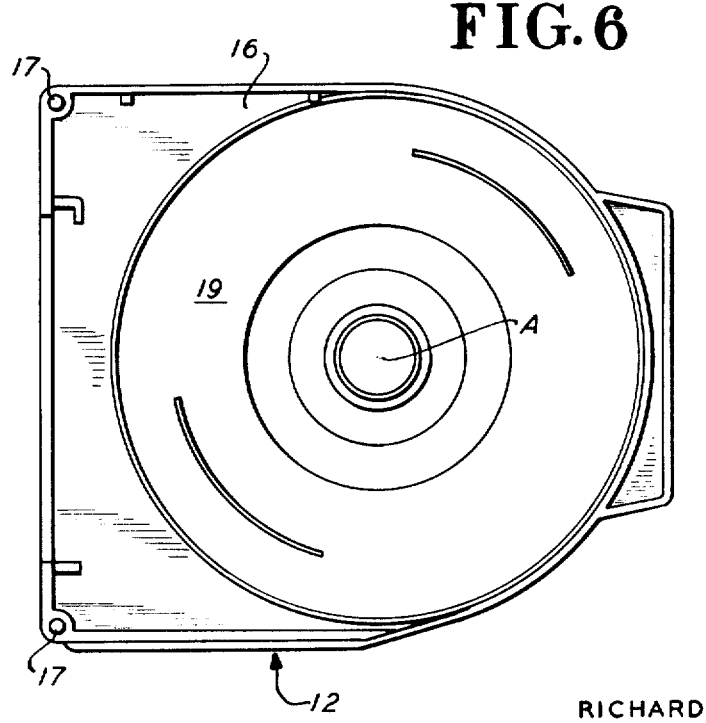
FIG. 6 is an inside view of the cover section of the cartridge.

Preferably, in the advance movement of the film it is drawn from the outside convolution of the supply roll 23 and returned to the inside convolution through the loop path before described wherein the supply roll turns thru about 135° of rotation during a movement of each element of the film through the length of the loop. In such closed loop cartridge there must be continuous slipping between all convolutions of the supply roll to prevent the roll from contracting or expanding and of jamming against the center core or the outside wall of the cartridge depending upon the direction of drive of the film. When the film is advanced intermittently by the pawl 55 there is an agitation imparted to the supply roll by the drive claw which keeps the successive convolutions in a loose state. However, when the film is driven smoothly by the sprocket wheel during scan and rewind an auxiliary means is required to keep the roll sufficiently agitated to prevent jamming. The means for so agitating the supply roll according to the invention comprises a rocker 93 of a flexible spring material having apertured ears 94 centrally thereof pivoted on a pin 95 staked to a bracket 96 itself secured by rivets to the cartridge section 15 as shown in FIG. 5. Journaled to the rocker at each end thereof is a roller 97 having flats 98 thereon at 90° intervals. The rocker 93 is positioned so that the rollers 97 support the supply roll at the point where the film is drawn from the roll during the advance movement of the film. The rollers 97 have a high surface friction with the film and a minimum rotational resistance so that as the film is drawn from the supply roll the rollers will turn causing the flats to provide a vibrating support for the supply roll. Since the rocker itself is of a spring material it is itself flexed by the vibration which the rollers impart to the supply roll to enhance the agitation.

At the top of the supply roll there is a rocker 99 pivoted centrally thereof to an arm 100 itself pivoted at 101 to a bracket 102 secured to the cartridge section 15. This rocker has depending ears 103 at each end which ride slidably on the supply roll by the weight of the rocker 99 and arm 100. This rocker aids in maintaining the supply roll in effective contact with the supporting rocker 93 to assure continuous agitation of the supply roll during both scan and rewind of the film.

The control circuitry of the present projector shown in FIG. 10 comprises an a.c. circuit leading from a 110 volt 60 cycle source, indicated at 105, through a push button switch 106 to the drive motor 41 for the step advance mechanism. Further, a control circuit leads from a d.c. source, indicated by the terminals 107, to a 3 pole scan-control switch 108 of which poles P1 and P2 of this switch are connected to the plus terminal of the source 107 and pole P3 is connected to the negative terminal thereof. All poles have a central or neutral position; additionally, pole 1 has four operative positions — two above and two below neutral position — marked from 1 to 4; pole P2 has one common position corresponding to positions 1 and 2 and one common position corresponding to positions 3 and 4 of pole P1; and pole P3 has two positions corresponding respectively to positions 1 and 4 of pole P1.

"Position 1" is a "forward scan" position causing the scan motor 65 to be connected across the d.c. source 107 via a circuit 109 and an on-off switch 110, and further causing rocker solenoid 85 to be connected across the d.c. source from the plus terminal via lead 111, pole P2 and circuit 112 back to negative terminal at the source 107. The switch 110 is operated closed by the rocker plate 75 as this plate is pushed rearwardly by solenoid 85 to engage the sprocket wheel 77 with the film (FIG. 3). Since the scan motor is already started the film is now advanced in a forward direction.

When the scan control switch 108 is shifted to "2" position, power to the scan motor is cut off but the solenoid 85 remains energized via the tie line 113 bridging the 1 and 2 contacts associated with the pole P2. Thus the sprocket wheel 77 is kept engaged with the film, and the switch 110 remains closed and the switch 114 associated therewith via the tie line 115 is retained in its down position. The brake solenoid 84 is therefore now activated to bring the drive of the sprocket wheel 77 to a sudden stop, this sudden stopping of the sprocket wheel being made possible by the fact that the belt coupling to the scan drive motor 65 yields to slippage as the motor is coasting to a stop.

When the scan control switch 108 is shifted to neutral position, both the brake solenoid 84 and the rocker plate solenoid 85 are deenergized causing the switch 110 to open and the switch 114 to return to its upper position. This return of the switch 114 connects the d. c. power source to the step advance line 116 through push button switch 117 and variable pulse generator 118 to clutch solenoid 63 for the stepping mechanism. The generator is settable to produce pulses at a variable rate from 1 to 18 per second. Each pulse effects a momentary closure of the line 116 to activate the solenoid 63 and engage instantly the clutch 60 whereby to start the stepper mechanism to effect a frame advance. Each frame advance is carried out at the same high speed determined by the motor 41, but the frequency of the frame advances is determined by the pulse rate setting of the generator 118, it being understood that the successive frames are held stationary for longer intervals between successive frame advances as the frame rate is decreased. The advantage of this procedure is that each frame advance is carried out at a high speed to avoid blur regardless of the framing rate as opposed to conventional projectors wherein each frame advance is carried out at a speed proportional to the framing rate.

When the scan control switch 108 is shifted to "4" position the rocker solenoid 85 is again energized via pole P2 to cause the switch 114 to open the stepper drive circuit 116 and switch 110 to close the circuit to the scan motor 65. The scan motor 65 is now driven in a reverse direction by the reverse polarity of the current to the motor via line 119 from the negative terminal of the source 107, and pole P3 to the top terminal of the motor and via line 120 connecting the bottom terminal of the motor to the positive terminal of the source 107.

When the scan control switch 108 is returned to "3" position the solenoid 85 is kept energized via the pole P2 and the bridging line 121 to retain the sprocket wheel 77 engaged with the film, the current to the scan motor 65 is cut off, and as an instant following the cut off of the current to the motor the brake solenoid 84 is energized via switch 114 now in its operate position to bring the drive of the sprocket wheel 77 to a sudden stop.

The embodiment of my invention herein particularly shown and described is intended to be illustrative and not necessarily limitative of my invention since the same is subject to changes and modifications without departure from the scope of my invention which I endeavor to express according to the following claims.

I claim:

1. A cartridge for an endless film comprising a case, a reel and an endless supply roll of film on said reel having a loop between the inner and outer convolutions of the reel, said case having an opening exposing a portion of said loop to permit engagement of a drive means with said loop to drive the film in either direction, and means frictionally engaging the film where the loop leads tangentially from said outer convolution for vibrating the supply roll to keep the convolutions thereof in a loose condition as the film is propelled by said drive means wherein said vibrating means comprises a rocker pivoted at the center thereof to said case, a pair of non-circular friction rollers with peripheral flats journaled to the ends of said rocker, and means mounting said case in an upright position with said supply roll supported partially in cradle fashion by said non-circular rollers.

2. The film cartridge set forth in claim 1 including means engaging said roll approximately diametrically opposite to said rocker for biasing the roll against said non-circular rollers.

3. The film cartridge set forth in claim 1 wherein said reel has a flange at one side and said reel has a peripheral edge of reducing diameter proceeding from said flange to the other side of the reel.

4. The film cartridge set forth in claim 1 wherein said rocker is made of a spring material responsive to the impact of said non-circular rollers against the supply roll to accentuate the vibrating effect of said rollers on the supply roll.

5. A film projector having an endless loop cartridge including a supply roll of film having a loop between the inner and outer convolutions thereof, an intermittent drive mechanism for advancing said loop of the film one frame at a time, a scan and rewind drive mechanism for continuously driving said loop of the film in either direction, means in said cartridge for keeping said convolutions in an open condition during the continuous driving of the film, means for biasing each of said drive mechanisms out of engagement with the film when the drive mechanism is in a stopped condition, and means selectively operable to engage one or the other of said drive mechanisms with the film.

6. The film projector set forth in claim 5 wherein said intermittent and continuous drive mechanisms are independent of each other, and switch means for selectively activating said drive mechanisms.

7. A film projector having an endless loop cartridge, a reversible scan mechanism for driving the film in either direction including a reversible drive motor, a sprocket wheel engageable with the film, a belt-type speed reduction coupling between said motor and said sprocket wheel, a ratchet wheel secured to the shaft of said sprocket wheel, and a pawl engageable with said ratchet wheel to bring said sprocket wheel to a sudden stop with momentary slippage in said coupling, wherein said pawl is of a double-arm type shiftable to engage said ratchet wheel at diametrically opposite sides to latch said ratchet wheel in either direction, including separate electrically energizable means for rocking said pawl to engage said separate arms with said ratchet wheel.

8. A film projector having an endless loop cartridge, a reversible scan mechanism for driving the film in either direction including a reversible drive motor, a sprocket wheel engageable with the film, a belt-type speed reduction coupling between said motor and said sprocket wheel, a ratchet wheel secured to the shaft of said sprocket wheel, a pawl engageable with said ratchet wheel to bring said sprocket wheel to a sudden stop with momentary slippage in said coupling, a frame, a rocker plate pivoted to said frame, means journaling said sprocket wheel on said rocker plate whereby the sprocket wheel is shifted into and out of engagement with the film as said rocker plate is shifted, and a solenoid for shifting said rocker plate.

9. The film projector set forth in claim 8 where said pawl is pivoted to said rocker plate including means for shifting said pawl into engagement with said ratchet wheel to stop the drive of said sprocket wheel and for thereupon controlling said solenoid to cause the sprocket wheel to be shifted out of engagement with the film.

10. The film projector set forth in claim 9 including interacting means between said pawl and said frame to cause the pawl to be maintained in engagement with the sprocket wheel while the sprocket wheel is disengaged from the film.

* * * * *